United States Patent
Inagawa et al.

(10) Patent No.: US 9,689,494 B2
(45) Date of Patent: Jun. 27, 2017

(54) HYDRAULIC CONTROL UNIT

(75) Inventors: Tomokazu Inagawa, Susono (JP);
Kenta Kimura, Susono (JP); Takafumi Inagaki, Susono (JP); Yuji Hattori, Gotemba (JP); Yu Nagasato, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 222 days.

(21) Appl. No.: 14/406,612

(22) PCT Filed: Jun. 14, 2012

(86) PCT No.: PCT/JP2012/065249
§ 371 (c)(1),
(2), (4) Date: Dec. 9, 2014

(87) PCT Pub. No.: WO2013/186899
PCT Pub. Date: Dec. 19, 2013

(65) Prior Publication Data
US 2015/0184744 A1    Jul. 2, 2015

(51) Int. Cl.
*F16H 61/02* (2006.01)
*F16H 61/662* (2006.01)
*F16H 61/00* (2006.01)

(52) U.S. Cl.
CPC ... *F16H 61/66272* (2013.01); *F16H 61/0025* (2013.01); *F16H 61/0031* (2013.01); *F16H 61/0206* (2013.01); *B60Y 2400/72* (2013.01); *F16H 2061/0034* (2013.01); *F16H 2061/66286* (2013.01); *F16H 2061/66295* (2013.01)

(58) Field of Classification Search
CPC ............. F16H 2061/0034; F16H 61/00; F16H 61/0206; F16H 61/0025; F16H 61/66272
See application file for complete search history.

(56) References Cited

U.S. PATENT DOCUMENTS

| | | | |
|---|---|---|---|
| 8,845,488 B2* | 9/2014 | Kawakami | F16H 61/0031 477/110 |
| 9,266,519 B2* | 2/2016 | Morino | F16H 61/00 |
| 2011/0213533 A1* | 9/2011 | Ueoka | B60K 6/445 701/66 |

FOREIGN PATENT DOCUMENTS

| | | |
|---|---|---|
| JP | 11-153214 A | 6/1999 |
| JP | 2009-097677 A | 5/2009 |
| JP | 2010-151240 A | 7/2010 |

* cited by examiner

*Primary Examiner* — Eric Keasel
*Assistant Examiner* — Abiy Teka
(74) *Attorney, Agent, or Firm* — Andrews Kurth Kenyon LLP

(57) ABSTRACT

A hydraulic control unit configured to improve energy efficiency is provided. The hydraulic control unit is comprised of: a feeding passage that delivers fluid from at least any of an oil pump and an accumulator storing hydraulic pressure to an actuator; a draining passage that discharge the fluid from the actuator to a drain spot; and a discharging means that is configured to selectively discharge the fluid from the actuator to the accumulator through the feeding passage, if the fluid has to be discharged from the actuator and a pressure of the accumulator is lower than that of the actuator.

13 Claims, 8 Drawing Sheets

HYDRAULIC CONTROL UNIT

CROSS-REFERENCE TO RELATED APPLICATION

This is a national phase application based on the PCT International Patent Application No. PCT/JP2012/065249 filed Jun. 14, 2012, the entire contents of which are incorporated herein by reference.

TECHNICAL FIELD

The present invention relates to a hydraulic control unit for delivering and draining hydraulic fluid to/from an actuator.

BACKGROUND ART

A speed ratio and a transmission torque capacity of a vehicle transmission are customarily altered by a hydraulic pressure. For example, Japanese Patent Laid-Open No. 2010-151240 describes a hydraulic control device of a belt-driven continuously variable transmission. The hydraulic control device is comprised of a low pressure circuit to which low pressure fluid regulated by lowering an initial pressure of a pump is delivered, and a high pressure circuit to which high pressure fluid higher than said low pressure is delivered. The low pressure circuit includes friction sites of the continuously variable transmission and lubrication sites such as a bearing. The high pressure circuit includes hydraulic chambers of a drive pulley and a driven pulley to which a drive belt is applied, and an accumulator storing high pressure fluid. The drive pulley is provided with an intensifier valve for supplying the fluid to the hydraulic chamber, and a depressurization valve for draining the fluid from the hydraulic chamber. Also, the driven pulley is provided with an intensifier valve for supplying the fluid to the hydraulic chamber, and a depressurization valve for draining the fluid from the hydraulic chamber. A communication between the accumulator and the pump is provided through a check valve. According to the teachings of Japanese Patent Laid-Open No. 2010-151240, the hydraulic control device is configured to deliver the fluid from the accumulator to the chambers of pulleys to alter a speed ratio moderately. By contrast, the fluid is delivered from the pump to the chambers of pulleys to alter a speed ratio rapidly.

Japanese Patent Laid-Open No. 2009-97677 describes a control device for variable displacement pump motor type transmission. The control device is comprised of a pair of hydraulic pump motors, and a closed circuit formed by connecting an inlet side passage connecting inlet ports with an outlet side passage connecting outlet ports. A first relief valve is disposed on a communication passage connecting the inlet side passage and the outlet side passage. The first relief valve is opened when the fluid pressurized higher than a predetermined level leaks from the inlet port of one of the pump motors to discharge the highly pressurized fluid from the closed circuit. That is, the first relief valve maintains the pressure of the inlet side passage to the predetermined pressure. A second relief valve is disposed on another communication passage connecting the inlet side passage and the outlet side passage. The second relief valve is opened when the fluid pressurized higher than a predetermined level leaks from the outlet port of one of the pump motors to discharge the highly pressurized fluid from the closed circuit. That is, the second relief valve maintains the pressure of the outlet side passage to the predetermined pressure. Additionally, inlet side passage is connected with the accumulator though a check valve. According to the teachings of Japanese Patent Laid-Open No. 2009-97677, therefore, the highly pressurized fluid is accumulated in the accumulator by closing the first relief valve without discharging from the closed circuit when the pressure of the inlet side passage is raised.

As described, according to the hydraulic control device taught by Japanese Patent Laid-Open No. 2010-151240, the intensifier valve for drive pulley is opened when upshifting is carried out to reduce the speed ratio, so that the fluid is delivered from the accumulator or the pump to the chamber. Consequently, a groove width of the drive pulley is narrowed to increase a running radius of the belt. At the same time, the depressurized valve for the driven pulley is opened to widen a groove width of the driven pulley so that the fluid in the chamber of the driven pulley is discharged to a drain spot. Consequently, the hydraulic pressure in the chamber of the driven pulley is adjusted in accordance with the torque transmitting capacity thereof. Thus, according to the hydraulic control device taught by Japanese Patent Laid-Open No. 2010-151240, the highly pressurized fluid is discharged to the drain spot on the occasion of speed change operation. As a result of thus discharging the high pressure fluid during the speed change, an energy loss may be caused to worsen fuel efficiency of the vehicle.

DISCLOSURE OF THE INVENTION

In order to solve the foregoing technical problems, it is therefore an object of this invention to provide a hydraulic control unit for improving energy efficiency.

The present invention is applied to a hydraulic control unit comprised of a feeding passage that delivers fluid from at least any of an oil pump and an accumulator storing hydraulic pressure to an actuator, and a draining passage that discharge the fluid from the actuator to a drain spot. In order to achieve the above-explained objective, according to the present invention, the hydraulic control unit is provided with a discharging means that is configured to selectively discharge the fluid from the actuator to the accumulator through the feeding passage, if the fluid has to be discharged from the actuator and a pressure of the accumulator is lower than that of the actuator.

The hydraulic control unit of the present invention is further comprised of: a feeding valve that is disposed on the feeding passage to deliver the fluid from the accumulator to the actuator; a draining valve that is disposed on the draining passage to discharge the fluid from the actuator to the drain spot; and a first switching valve that is disposed on the feeding passage to selectively connect to the accumulator to the actuator. In addition, the discharging means may also be configured to connect the accumulator to the actuator by the first switching valve while opening the feeding valve and closing the draining valve, if the fluid has to be discharged from the actuator and the pressure of the accumulator is lower than that of the actuator.

The hydraulic control unit of the present invention is further comprised of: a passage connecting the discharging valve to the accumulator; and a second switching valve that is disposed on said passage to selectively connect the actuator to at least any one of the accumulator and the drain spot. In addition, the discharging means may also be configured to connect the accumulator to the actuator by the second switching valve while opening the draining valve and closing the feeding valve, if the fluid has to be discharged from the actuator and the pressure of the accumulator is lower than that of the actuator.

The discharging means may also be configured to open the draining valve, at least in any of cases: that a pressure difference between the actuator and the accumulator is smaller than a predetermined threshold value; and that a drop in the pressure of the actuator after discharging the fluid therefrom is smaller than a predetermined value.

The discharging means may also be configured to deliver the pressure of the actuator to a site where a relatively low pressure is required, if the fluid has to be discharged from the actuator and the pressure of the accumulator is lower than that of the actuator.

The hydraulic control unit of the present invention is further comprised of a third switching valve. An operating state of the third switching valve is selectively switched between: a first operating state where the hydraulic pressure established by the oil pump is delivered to the actuator and the accumulator, and a second operating state where the hydraulic pressure established by the oil pump is delivered only to the actuator without being delivered to the accumulator.

For example, a mechanical oil pump driven by an internal combustion engine, and an electric oil pump driven by an electric motor may be used as the oil pump of the present invention.

Specifically, a hydraulic chamber of a pulley of a belt-driven continuously variable transmission serves as the actuator of the present invention to which the hydraulic pressure is applied to narrow a groove width.

Thus, the hydraulic control unit selectively delivers the hydraulic fluid discharged from the actuator to the accumulator via the feeding passage given that the fluid has to be discharged from the actuator and a pressure of the accumulator is lower than that of the actuator. According to the present invention, therefore, the energy efficiency can be improved as compared to that of the case in which the hydraulic fluid discharged from the actuator is drained to the drain spot.

Specifically, if it is necessary to discharge the fluid from the actuator and the pressure thereof is higher than that of the accumulator, the first switching valve provide a communication between the accumulator and the actuator. In this case, the feeding valve is opened and the draining valve is closed. Consequently, the fluid in the actuator is allowed to be delivered to the accumulator via the feeding passage and the feeding valve. By contrast, if the pressure difference between the actuator and the accumulator is smaller than a predetermined threshold value, the draining valve is opened so that the fluid in the actuator can be discharged rapidly. The draining valve is also opened in case a drop in the pressure of the actuator is smaller than a predetermined threshold value to discharge the fluid from the actuator.

In case the fluid has to be discharged from the accumulator and the pressure of the actuator is higher than that of the accumulator, the accumulator may also be connected to the actuator by the second switching valve. In this case, the feeding valve is closed and the draining valve is opened so that the fluid in the actuator can be delivered to the accumulator via the draining valve and the passage on which the second switching valve is disposed.

As mentioned above, the hydraulic fluid in the actuator whose pressure is higher than that of the accumulator can be delivered to lubricate the site not requiring such high pressure.

According to the present invention, the fluid in the accumulator or the pump is allowed to be delivered to the actuator by bringing the third switching valve into the first operating state. In this case, the fluid can be not only delivered to the actuator but also returned to the accumulator by increasing a discharging amount of the oil pump. By contrast, given that the third switching valve is brought into the second operating state, the fluid can be delivered only to the actuator just as required even if the required amount of the fluid or the hydraulic pressure to be applied to the actuator is increased abruptly. In this case, the fluid will not be returned to the actuator. Therefore, the deficiency in the amount and pressure of the fluid in the actuator can be prevented or suppressed.

As described, both mechanical oil pump and motor-driven oil pump may be employed as the pump in the hydraulic control unit of the present invention As also described, the hydraulic control unit according to the present invention may be applied to control the pressure of the pulleys of the belt-driven continuously variable transmission. In this case, energy efficiency of the belt-driven continuously variable transmission can be improved by preventing a leakage of highly pressurized fluid.

BEST MODE FOR CARRYING OUT THE INVENTION

Figure 1:
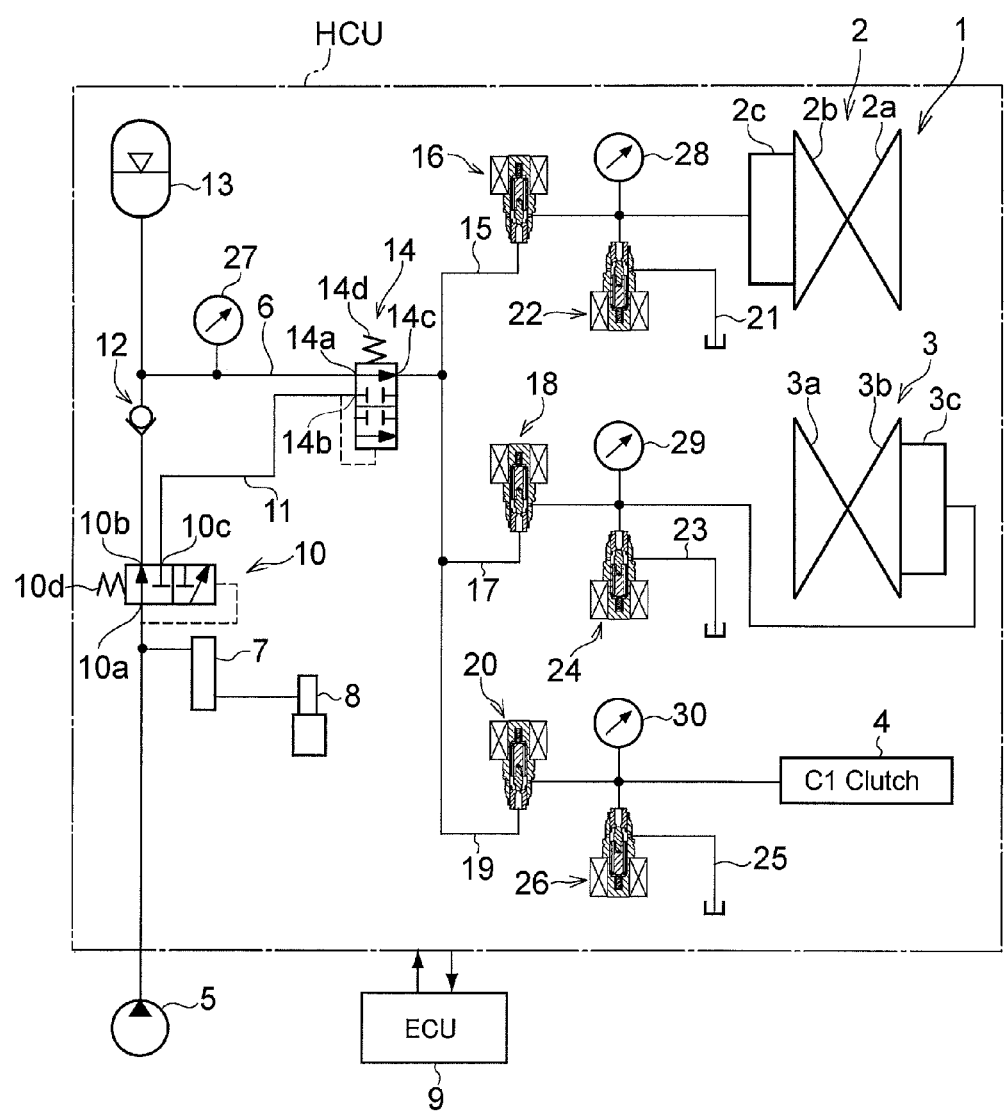
FIG. 1 is a view schematically illustrating one example of the hydraulic control unit according to the present invention.

The hydraulic control unit (abbreviated as "HCU" in the drawings) of the present invention may be applied not only to a transportation carrier such as an automobile and an air craft but also to a various kinds stationary industrial machineries. FIG. 1 shows a preferred example of applying the hydraulic control unit to a conventional belt-driven continuously variable transmission 1 commonly used in automobiles. A structure of the continuously variable transmission 1 will be briefly explained hereinafter. The continuously variable transmission 1 is comprised of a drive pulley 2 and a driven pulley 3. Specifically, the drive pulley 2 is comprised of a fixed sheave 2a and a movable sheave 2b allowed to reciprocate toward and away from the fixed sheave 2a, and a V-groove is formed between those sheaves 2a and 2b. Likewise, the driven pulley 3 is comprised of a fixed sheave 3a and a movable sheave 3b allowed to reciprocate toward and away from the fixed sheave 3a, and a V-groove is formed between those sheaves 3a and 3b. A torque transmission between those pulleys 2 and 3 is provided by a not shown drive belt running in the V-grooves of those pulleys. Accordingly, a speed ratio of the continuously variable transmission 1 can be varied continuously by altering a running radius of the drive belt. To this end, the drive pulley 2 is provided with a hydraulic chamber 2c to axially reciprocate the movable sheave 2b, and the driven pulley 3 is provided with a hydraulic chamber 3c to axially reciprocate the movable sheave 3b. According to the preferred example, a hydraulic pressure for altering the belt running radius to change a speed ratio is applied to the hydraulic chamber 2c, and a hydraulic pressure for clamping the drive belt by the pulleys 2 and 3 is applied to the hydraulic chamber 3c.

A C1 clutch 4 is arranged to selectively deliver torque to an input side or an output side of the continuously variable transmission 1. For example, a wet-type multiple plate clutch is used as the C1 clutch 4, and a torque transmitting capacity of the C1 clutch 4 is changed according to the hydraulic pressure applied thereto. Specifically, hydraulic pressure to achieve a required torque capacity to propel the vehicle is applied to the continuously variable transmission 1 and the C1 clutch 4. To this end, relatively high pressures to transmit the torque are applied to the hydraulic chambers 2c, 3c, and the C1 clutch 4. Accordingly, the hydraulic chambers 2c, 3c, and the C1 clutch 4 serves as an actuator of the present invention.

Next, here will be explained a structure for applying hydraulic pressure to the hydraulic chambers 2c, 3C, and the clutch C1. Although not illustrated in detail, there is provided a pump 5 driven by an engine or an electric motor, and a passage 6 provides a communication between the pump 5 and the hydraulic chamber 2c. A regulator valve 7 is connected to the passage 6 to regulate the pressure of the fluid discharged from the pump 5 to a predetermined operating pressure. Specifically, the operating pressure is a line pressure as an initial pressure of the hydraulic control system. In a vehicle, specifically, the operating pressure is established in accordance with a drive demand represented by an opening degree of an accelerator. The regulator valve 7 is used to regulate the fluid pressure, i.e., the operating pressure in the passage 6 in accordance with the signal pressure. For example, a conventional primary regulator valve adapted to establish the line pressure of an automatic transmission of automobiles may be employed as the regulator valve 7.

In order to alter the operating pressure depending on an operating condition of the hydraulic control unit and other external requirements, the signal pressure delivered to the regulator valve 7 has to be varied arbitrarily. For this purpose, a signal pressure establishing valve 8 is arranged in the hydraulic control unit. Specifically, the signal pressure establishing valve 8 is a linear solenoid valve adapted to output the signal pressure in response to a current applied to a solenoid. In order to control the hydraulic control unit, an electronic control unit (abbreviated as ECU) 9 serving as the controller of the invention is connected thereto. The ECU 9 is comprised mainly of a microcomputer, which is configured to carry out a calculation on the basis of data inputted thereto and preinstalled data, and to send a calculation result in the form of a control signal to the signal pressure establishing valve 8. In the example shown in FIG. 1, data about an opening degree of an accelerator, a vehicle speed, a fluid temperature etc. are inputted to the ECU 9.

A discharging outlet of the pump 5 is connected to a switching valve 10 for delivering the fluid selectively to the transmission. The switching valve 10 is comprised of an input port 10a connected with the discharging outlet of the oil pump 5, a pair of output ports 10b and 10c, a not shown spool selectively connecting the input port 10a with the output port 10b or the output port 10c, and a spring 10d pushing the spool elastically in the predetermined direction. Although not illustrated in detail, a pilot pressure is applied to the spool against the elastic force of the spring. The output port 10b is connected to the passage 6, and the output port 10c is connected to the passage 11.

According to the example shown in FIG. 1, a hydraulic pressure of the passage 6 is applied as a pilot pressure to the switching valve 10. Given that the pilot pressure is not applied to the switching valve 10 or the pilot pressure applied thereto is relatively low, the switching valve 10 is brought into a first operating state where the input port 10a is connected with the output port 10b. By contrast, given that the pilot pressure applied thereto is relatively high, the switching valve 10 is brought into a second operating state where the input port 10a is connected with the output port 10c. Accordingly, the switching valve 10 serves as the third switching valve of the present invention. The first operating state will also be an "ON-state", and the second operating state will also be an "OFF-state" in the following description.

The output port 10b is connected with an accumulator 13 through a check valve 12. Specifically, the check valve 12 is a one-way valve that is opened by the fluid flowing from the pump 5 toward the accumulator 13, and closed by the fluid flowing in the opposite direction. The accumulator 13 is a conventional accumulator having a container holding a not shown piston sustained by an elastic member such as a spring or a member elastically expanded by a gas encapsulated therein. That is, a capacity of the accumulator 13 is varied elastically to store the fluid applied thereto at a predetermined pressure level.

A discharging outlet of the accumulator 13 is connected to a switching valve 14 of the feeding side. The switching valve 14 is comprised of a pair of input ports 14a and 14b, an output port 14c, a not shown spool selectively connecting the input port 14a or 14b with the output port 14c, and a spring 14d elastically pushing the spool in the predetermined direction. Although not illustrated in detail, a pilot pressure is applied to the spool against the elastic force of the spring. According to the example of FIG. 1, a hydraulic pressure of the passage 11 is applied as a pilot pressure to the switching valve 14. In addition, the input port 14a is connected to the discharging outlet of the accumulator 13, the input port 14b is connected to the output port 10c of the switching valve 10, and the output port 14c is connected to the passage 6.

Specifically, the switching valve 14 is, under the OFF-state where the pilot pressure is not applied thereto or the pilot pressure applied thereto is relatively low, the input port 14a is connected with the output port 14c. To the contrary, under the ON-state where the pilot pressure is applied thereto is relatively high, the input port 14b is connected with the output port 14c. That is, the switching valve 14 is brought into OFF-state when the switching valve 10 is in the first operating state so that the accumulator 13 is connected with the hydraulic chambers 2c, 3c. In contrast, the switching valve 14 is brought into ON-state when the switching valve 10 is in the second operating state so that the discharging outlet of the pump 5 is connected with the hydraulic chambers 2c, 3c. Accordingly, the switching valve 14 serves as the first switching valve of the present invention.

As shown in FIG. 1, a feeding passage 15 branching out from the passage 6 is connected to a hydraulic chamber 2c of the drive pulley 2. A feeding solenoid valve 16 disposed on the feeding passage 15 is controlled electrically to deliver the fluid selectively to the hydraulic chamber 2c. Likewise, a feeding passage 17 also branching out from the passage 6 is connected to a hydraulic chamber 3c of the driven pulley 3. A feeding solenoid valve 18 disposed on the feeding passage 17 is controlled electrically to deliver the fluid selectively to the hydraulic chamber 3c. Further, a feeding passage 19 also branching out from the passage 6 is connected to a not shown hydraulic chamber of the C1 clutch 4. A feeding solenoid valve 20 is disposed on the feeding passage 19 and controlled electrically to selectively deliver the fluid to the hydraulic chamber of the C1 clutch 4.

A draining passage 21 extends from the feeding passage 15 between the feeding solenoid valve 16 of and the hydraulic chamber 2c, and a draining solenoid valve 22 controlled electrically is disposed the draining passage 21 to selectively drain the fluid from the hydraulic chamber 2c to a drain spot such as an oil pan. Likewise, a draining passage 23 extends from the passage 17 between the feeding solenoid valve 18 and the hydraulic chamber 3c, and a draining solenoid valve 24 controlled electrically is disposed on the draining passage 23 to selectively drain the fluid from the hydraulic chamber 3c to a drain spot such as an oil pan. Further, a draining passage 25 extends from the passage 19 between the feeding solenoid valve 20 and a not shown hydraulic chamber of the C1 clutch 4, and a draining solenoid valve 26 controlled electrically is disposed on the draining passage 25 is to selectively drain the fluid from the hydraulic chamber of the C1 clutch 4.

As described, a solenoid valve electrically controlled to open and close a port thereof is individually used as each feeding solenoid valve 16, 18 and 20 and each draining solenoid valve 22, 24 and 26. When the solenoid valve is not energized (i.e., under OFF-state), the ports thereof is closed in a manner to prevent fluid leakage therefrom. For this reason, the current speed ratio and transmission torque can be maintained by confining the fluid in the hydraulic chamber 2c, 3c and the C1 clutch 4 even in case a power distribution to the valves is interrupted accidentally. In addition, the example shown in FIG. 1 is further provided with an input pressure sensor 27 to detect a pressure Pacc of the fluid from the accumulator 13, a drive side control pressure sensor 28 to detect a pressure Pri of the fluid from the hydraulic chamber 2c, a driven side control pressure sensor 29 to detect a pressure Pd of the fluid from the hydraulic chamber 3c, and an input pressure sensor 30 to detect a pressure Pc of the fluid from the clutch C1. The detected value of those pressure sensors 27, 28, 29 and 30 are sent to the ECU 9 in the form of detection signals to electrically control the valves 16, 18, 20, 22, 24 and 26 according to the detection signal.

Here will be briefly explained an action of the hydraulic control unit of the present invention. For example, in case of carrying out an upshifting of the belt-driven continuously variable transmission 1 shown in FIG. 1 in a moderate manner, the switching valve 10 is brought into the first operating state and the switching valve 14 is brought into the OFF-state. In case of carrying out a downshifting in a moderate manner, the switching valve 10 is also brought into the first operating state and the switching valve 14 is also brought into the OFF-state.

To the contrary, in case of carrying out an upshifting in an rapid manner, the switching valve 10 is brought into the second operating state and the switching valve 14 is brought into the ON-state. In case of carrying out a downshifting in a rapid manner, the switching valve 10 is brought into the first operating state and the switching valve 14 is brought into the ON state.

Figure 2:
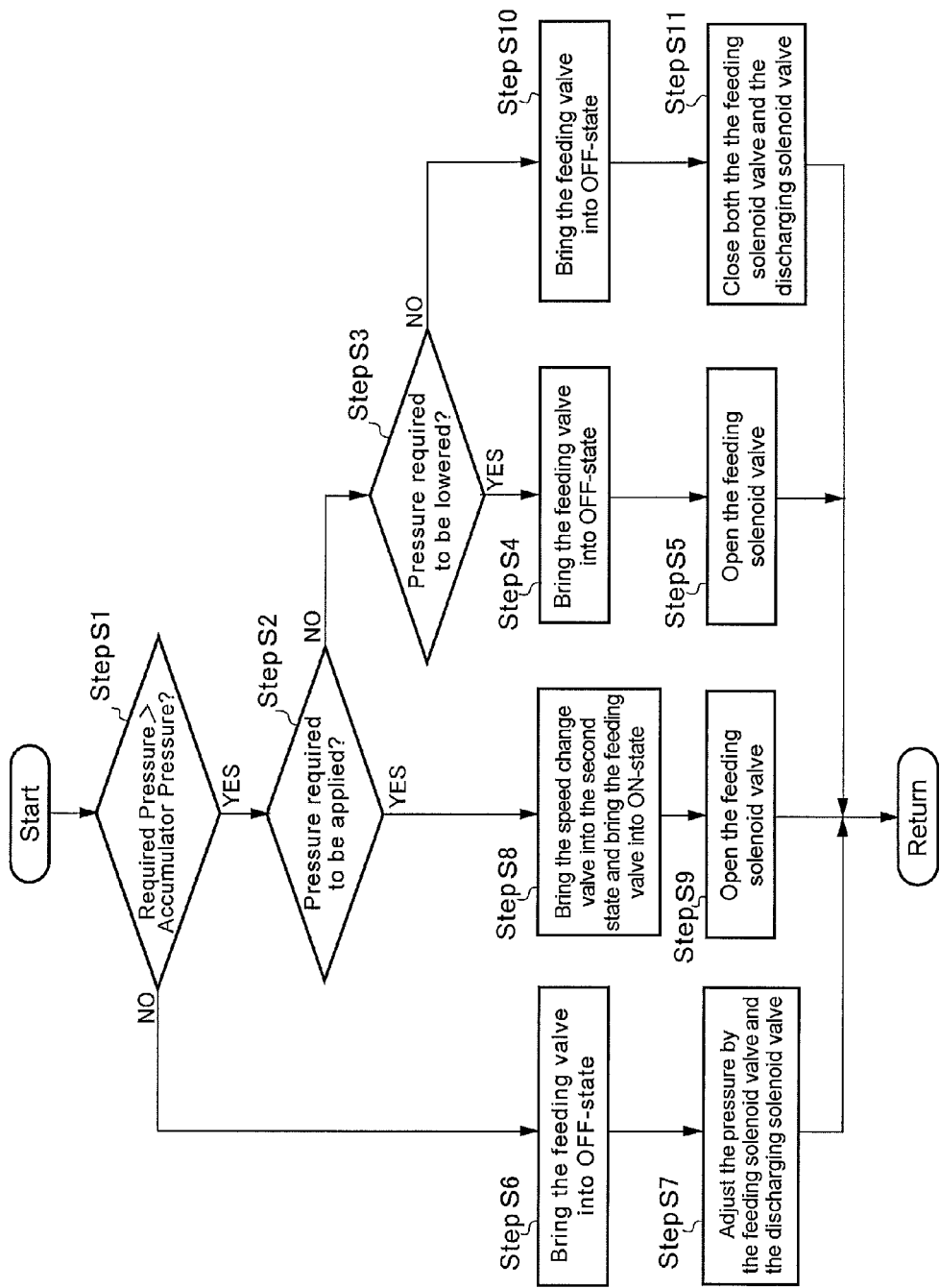
FIG. 2 is a flowchart showing the first control example of the hydraulic control unit according to the present invention.

Given that at least one of the operating pressure Pri, Pd and Pc of the fluid draining from the pulley 2, 3 and the C1 clutch 4 is higher than the accumulator pressure Pacc, the hydraulic control unit of the present invention performs the following controls. FIG. 2 is a flowchart explaining the first control example, and the routine shown therein is repeated at predetermined cycle. The first control example is carried out under the condition that the operating pressure Pd of the driven pulley 3 is higher than the accumulator pressure Pacc, and the fluid has to be drained from the driven pulley 3.

First of all, it is determined whether or not a current operating pressure Pd of the driven pulley 3 is higher than the accumulator pressure Pacc (at step S1). As described, the accumulator pressure Pacc is a pressure stored in the accumulator 13 that is detected by the pressure sensor 27, the operating pressure Pd of the driven pulley 3 is detected by the pressure sensor 29, and the operating pressure Pri of the drive pulley 2 is detected by the pressure sensor 28. The belt-driven continuously variable transmission 1 shown in FIG. 1 is required to transmit larger torque in accordance with an increase in the opening degree of the accelerator. To this end, both the operating pressure Pri of the drive pulley 2 and the operating pressure Pd of the driven pulley 3 are increased to increase the torque transmitting capacity of the transmission 1. A required operating pressure Pri of the drive pulley 2 and a required operating pressure Pd of the driven pulley 3 can be calculated based on the opening degree of the accelerator and a vehicle speed. More specifically, the required pressures Pri and Pd are determined with reference to preinstalled maps determining a relation between the pressure Pri of the drive pulley 2 and those parameters, and a relation between the pressure Pd of the driven pulley 3 and those parameters.

If the answer of step S1 is YES, it is determined whether or not the hydraulic pressure has to be applied to the driven pulley 3 (at step S2). At step S2, specifically, it is determined whether or not a current clamping pressure is lower than a required clamping pressure. If the current clamping pressure is higher than the required clamping pressure so that the answer of step S2 is NO, it is determined whether or not the hydraulic pressure applied to the hydraulic chamber 3c has to be lowered (at step S3). At step S3, specifically, it is determined whether or not the current clamping pressure is higher than the required clamping pressure or higher than an upper limit of acceptable range of the clamping pressure.

If the current clamping pressure is higher than the required clamping pressure or higher than the upper limit of the acceptable range of the clamping pressure so that the answer of step S3 is YES, the switching valve 14 is brought into the OFF-state so as to lower the belt clamping pressure (at step 4). In specific, the ECU 9 increases the signal pressure established by the signal pressure establishing valve 8 to raise a regulating level of the regulator valve 7 thereby increasing a line pressure. Consequently, the switching valve 10 is brought into the second operating state so that the highly pressurized fluid is delivered to the passage 11 as the line pressure. In the example shown in FIG. 1, the hydraulic pressure in the passage 11 is used as the pilot pressure so that the switching valve 14 is brought into the second operating state with an increase in the pressure in the passage 11. In this situation, the input port 14a and the output port 14c are connected to each other as described above.

After or simultaneously with carrying out the control of step S4, the feeding solenoid valve 18 of the driven pulley 3 is opened (at step S5). Although not illustrated in detail, the draining solenoid valve 24 is opened on the occasion of carrying out the operation of step S5. In this situation, both the feeding solenoid valve 16 of the drive pulley 2 and the draining solenoid valve 22 are opened. Consequently, the accumulator 13 is connected with the hydraulic chamber 3c through the feeding solenoid valve 18 so that the relatively higher pressure Pd of the hydraulic chamber 3c is allowed to be applied to the accumulator 13 in which the pressure is relatively lower pressure through the passages 17 and 6. As a result, the current belt clamping pressure is reduced. Then the routine shown in FIG. 2 is returned. Accordingly, the feeding passage 17 and the passage 6 serve as the feeding passage of the present invention.

If the answer of step S1 is NO, the switching valve 14 is brought into OFF-state (at step S6). After or simultaneously with carrying out the control of step S6, the feeding solenoid valve 18 and the draining solenoid valve 24 are electrically controlled to deliver the fluid from the accumulator 13 to the hydraulic chamber 3c, or to drain the fluid from the hydraulic chamber 3c, so as to achieve the required belt clamping pressure (at step S7). Then the routine shown in FIG. 2 is returned.

If the answer of step S2 is YES, the switching valve 10 is brought into the second operating state and the switching valve 14 is opened (at step S8). Consequently, the passage connecting the accumulator 13 with the solenoid valves 16 and 18 is opened. After or simultaneously with carrying out the step S8, the feeding solenoid valve 18 is opened and the draining solenoid valve 24 is closed (at step S9). As a result, the pressure of the hydraulic chamber 3c is increased so that the belt clamping pressure is increased to the required level. Then the routine shown in FIG. 2 is returned.

If the answer of step S3 is NO, the switching valve 14 is brought into OFF-state (at step S10). After or simultaneously with carrying out the control of step S10, both the feeding solenoid valve 18 and the draining solenoid valve 24 are closed (at step S11). Those steps S10 and S11 are carried out to confine the pressure in the hydraulic chamber 3c and to maintain the pressure confined therein. In this case, since the switching valve 14 is in the OFF-state the hydraulic fluid can be delivered promptly from the accumulator 13 to the hydraulic chambers 2c and 3c to change the speed ratio. Then the routine shown in FIG. 2 is returned.

Thus, according to the control example of FIG. 2, relatively high pressure Pd of the hydraulic chamber 3c can be applied to the accumulator 13 so that energy efficiency of the hydraulic control unit of the present invention can be improved.

Figure 3:
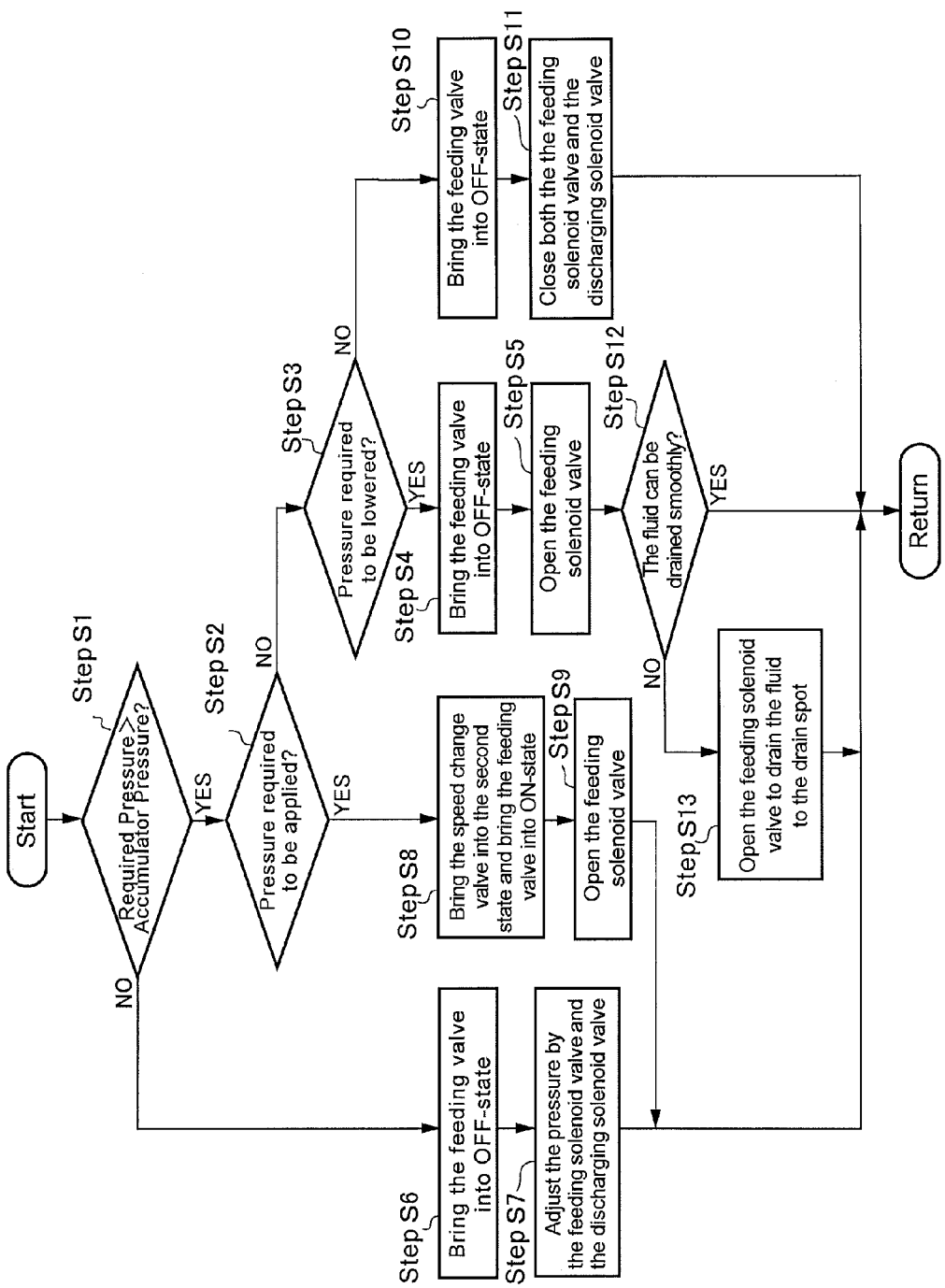
FIG. 3 is a flowchart showing the second control example of the hydraulic control unit according to the present invention.

According to the example shown in FIG. 2, it would be difficult to drain the fluid from the hydraulic chamber 3c if a pressure difference between the operating pressure Pd and the accumulator pressure Pacc is small. FIG. 3 shows a flowchart for draining the fluid promptly from the hydraulic chamber 3c. Here, in the flowchart of FIG. 3, common numbers are allotted to the steps identical to those in FIG. 2.

According to the example shown in FIG. 3, after step S5, it is determined whether or not the fluid in the hydraulic chamber 3c can be drained (at step S12). To this end, it is judged whether or not the pressure difference between the operating pressure Pd and the accumulator pressure Pacc is larger than a predetermined threshold value. Alternatively, the determination at step S12 may also be made by determining whether or not a drop in the operating pressure Pd detected by the pressure sensor 29 is smaller than a predetermined threshold value. If such pressure difference is larger than the predetermined threshold value, the fluid can be drained promptly from the hydraulic chamber 3c toward to the accumulator 13. To the contrary, if the pressure difference is smaller than the predetermined threshold value, the fluid may not be drained from the hydraulic chamber 3c smoothly.

If the answer of step S12 is NO, the draining solenoid valve 24 is opened (at step S13). Specifically, both the feeding solenoid valve 18 and the draining solenoid valve 24 are opened to lower the operating pressure Pd of the hydraulic chamber 3c promptly. To the contrary, if the answer of t step S12 is YES, the fluid is allowed to be drained promptly from the hydraulic chamber 3c toward the accumulator 13. Then, the routine shown in FIG. 3 is returned.

Thus, according to the control example of FIG. 3, the draining solenoid valve 24 is opened in case the pressure difference between the operating pressure Pd and the accumulator pressure Pacc is small and the fluid is therefore drained from the hydraulic chamber 3c slowly. For this reason, the fluid is allowed to be drained promptly from the hydraulic chamber 3c so that the control response of the hydraulic control unit can be improved.

As described, the hydraulic control unit shown in FIG. 1 is configured to apply the operating pressure Pd to the accumulator 13 through the feeding solenoid valve 18 in case the operating pressure Pd of the fluid discharged from the hydraulic chamber 3c of the driven pulley 3 is higher than the accumulator pressure Pacc. Instead, as shown in FIG. 4, it is also possible to apply the relatively high operating pressure Pd to the accumulator 13 through the draining solenoid valve 24.

Figure 4:
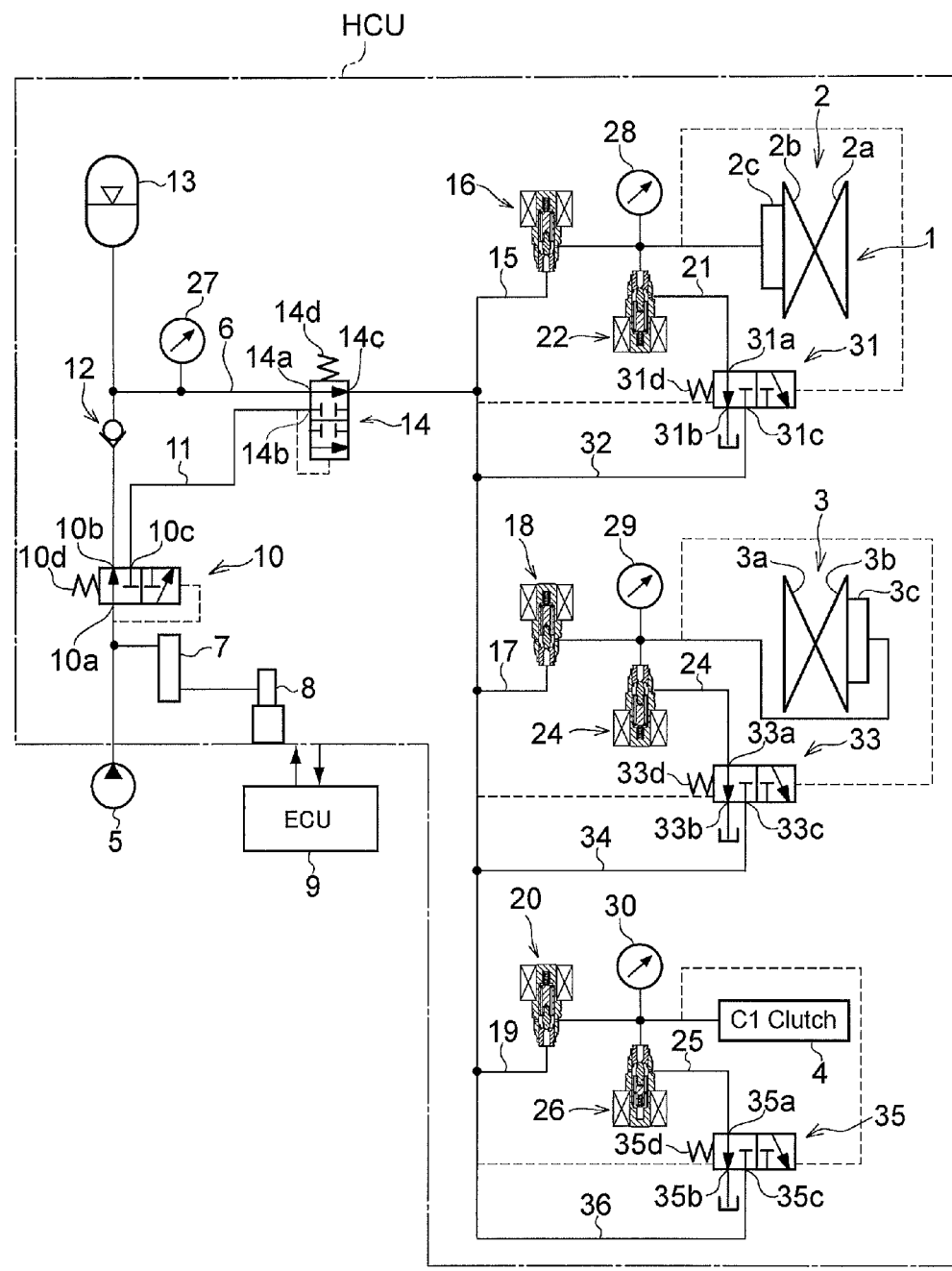
FIG. 4 is a view schematically illustrating another example of the hydraulic control unit according to the present invention.

According to another example shown in FIG. 4, a switching valve 31 of the draining side is disposed on the draining passage 21 of the drive pulley 2 between the draining solenoid valve 22 and a drain spot. The switching valve 31 is comprised of an input port 31a connected to the draining solenoid valve 22, and a pair of output ports 31b connected to the drain spot and 31c connected to the passage 32, a not shown spool that selectively provide a connection between the input port 31a and the output port 31b or the output port 31c, and a spring 31d that elastically pushes the spool in the predetermined direction. In the example shown in FIG. 4, the operating pressure Pri of the drive pulley 2 is applied as a pilot pressure to the spool not only in the direction to increase the elastic force of the spring 31d but also in a direction against the elastic force of the spring 31d. That is, the pilot pressure delivered from the hydraulic source, and the pilot pressure discharged from the hydraulic chamber 2c are applied to the spool of the switching valve 31. Specifically, under the OFF-state where a total pressure of the elastic force of the spring 31d and the pilot pressure from the accumulator 13 is higher than the pressure discharged from the hydraulic chamber 2c, the input port 31a is communicated with the output port 31b. To the contrary, under the ON-state where the total pressure is lower than the pilot pressure discharged from the hydraulic chamber 2c, the input port 31a is communicated with the output port 31c. Thus, given that operating pressure Pri of the hydraulic chamber 2c is higher than the accumulator pressure Pacc, the switching valve 31 is brought into ON-state.

A switching valve 33 of the draining side is disposed on the draining passage 23 of the driven pulley 3 between the discharging solenoid valve 24 and a drain spot. The switching valve 33 is comprised of an input port 33a connected to the discharging solenoid valve 24, and a pair of output ports 33b connected to the drain spot and 33c connected to the passage 34, a not shown spool that selectively provide a connection between the input port 33a and the output port 33b or the output port 33c, and a spring 33d that elastically pushes the spool in the predetermined direction. In the example shown in FIG. 4, the operating pressure Pd of the driven pulley 3 is applied as a pilot pressure to the spool not only in the direction to increase the elastic force of the spring 33d but also in a direction against the elastic force of the spring 33d. That is, the pilot pressure delivered from the hydraulic source, and the pilot pressure discharged from the hydraulic chamber 3c are applied to the spool of the switching valve 33. Specifically, under the OFF-state where a total pressure of the elastic force of the spring 33d and the pilot pressure from the accumulator 13 is higher than the pressure discharged from the hydraulic chamber 3c, the input port 33a is communicated with the output port 33b. To the contrary, under the ON-state where the total pressure is lower than the pilot pressure discharged from the hydraulic chamber 3c, the input port 33a is communicated with the output port 33c. Thus, given that operating pressure Pd of the hydraulic chamber 3c is higher than the accumulator pressure Pacc, the switching valve 33 is brought into ON-state.

Likewise, a switching valve 35 of the draining side is disposed on the draining passage 25 of the C1 clutch 4 between the discharging solenoid valve 26 and a drain spot. The switching valve 35 is comprised of an input port 35a connected to the discharging solenoid valve 26, and a pair of output ports 35b connected to the drain spot and 35c connected to the passage 6, a not shown spool that selectively provide a connection between the input port 35a and the output port 35b or the output port 35c, and a spring 35d that elastically pushes the spool in the predetermined direction. In the example shown in FIG. 4, the operating pressure Pc of the C1 clutch 4 is applied as a pilot pressure to the spool not only in the direction to increase the elastic force of the spring 35d but also in a direction against the elastic force of the spring 35d. That is, the pilot pressure delivered from the hydraulic source, and the pilot pressure discharged from the C1 clutch 4 are applied to the spool of the switching valve 35. Specifically, under the OFF-state where a total pressure of the elastic force of the spring 35d and the pilot pressure from the accumulator 13 is higher than the pressure discharged from the C1 clutch 4, the input port 35a is communicated with the output port 35b. To the contrary, under the ON-state where the total pressure is lower than the pilot pressure discharged from the C1 clutch 4, the input port 35a is communicated with the output port 35c. Thus, given that operating pressure Pc of the C1 clutch 4 is higher than the accumulator pressure Pacc, the switching valve 35 is brought into ON-state. Accordingly, the switching valves 31, 33 and 35 serve as the second switching valve.

Figure 5:
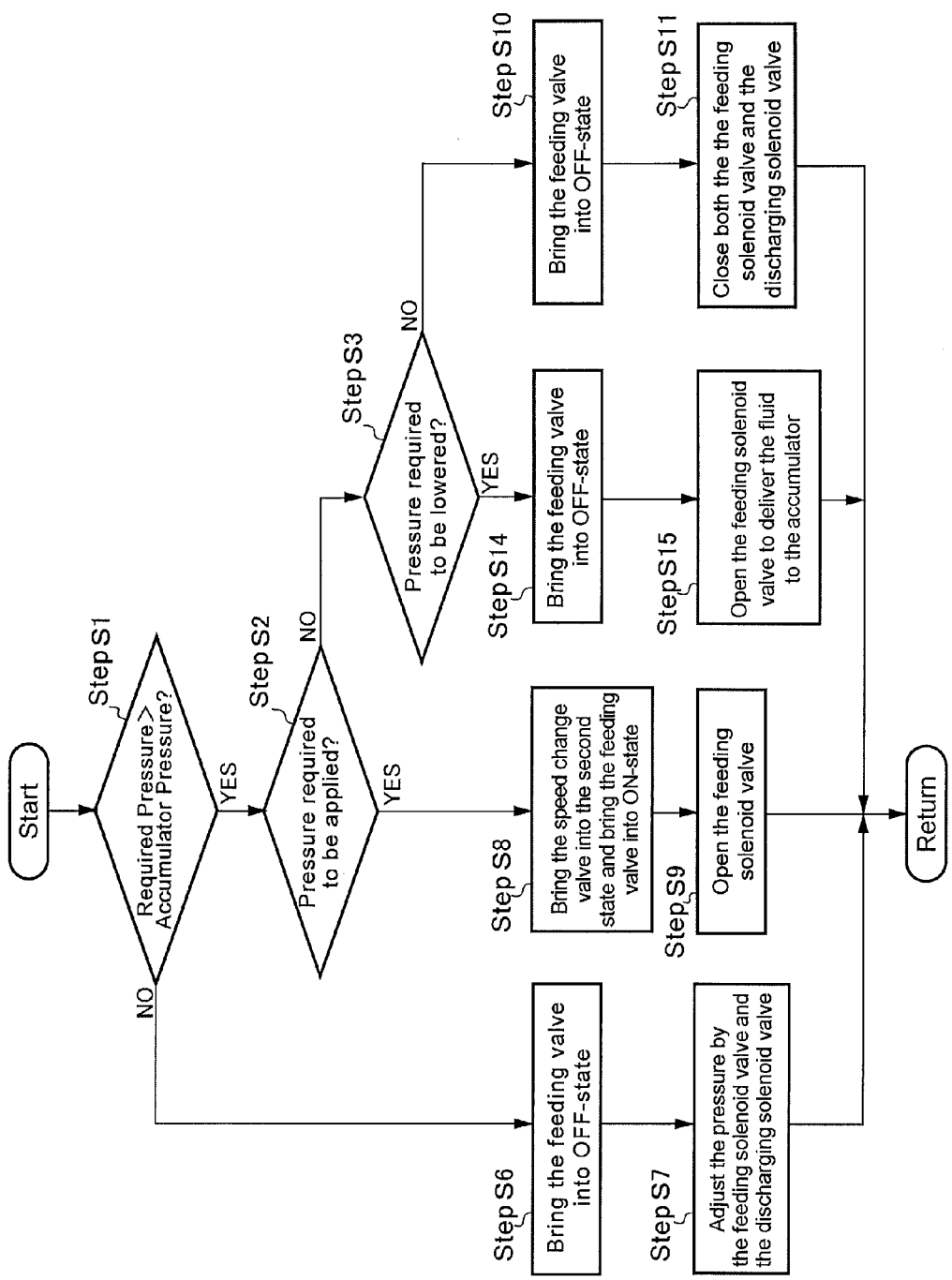
FIG. 5 is a flowchart showing the third example of the hydraulic control unit according to the present invention.

Referring now to FIG. 5, there is shown the third control example carried out by the hydraulic control unit shown in FIG. 4. The routine shown therein is repeated at predetermined cycle. Here, in the flowchart shown in FIG. 5, common numbers are allotted to the steps identical to those in FIG. 2. If the answer of step S3 is YES, the switching valve 14 is brought into the OFF-state as the example shown in FIG. 2, and the switching valve 33 is also brought into the OFF-state (at step S14). That is, at the step S14, the accumulator 13 is connected with the discharging solenoid valve 24 through the passages 6 and 34. In this case, since the pilot pressure discharged from the hydraulic chamber 3c is higher than the total pressure of the elastic force of the spring 33d and the pilot pressure applied from the accumulator 13, that is, since the operating pressure Pd is sufficiently higher than the accumulator pressure Pacc, the switching valve 33 is brought into the ON-state to provide a communication between the input port 33a and the output port 33c.

After or simultaneously with carrying out of step S14, the discharging solenoid valve 24 is opened (at step S15). Although not illustrated in detail, the feeding solenoid valve 18 is opened when the operation of the step S15 is carried out. In this situation, the feeding solenoid valve 16 of the drive pulley 2 is opened, and the draining solenoid valve 22 is closed. Consequently, the accumulator 13 in which the pressure is relatively lower is connected to the hydraulic chamber 3c so that the relatively higher pressure of the hydraulic chamber 3c is applied to the accumulator 13 through the passages 34 and 6. As a result, the operating pressure Pd of the hydraulic chamber 3c is lowered so that the belt clamping pressure is lowered. Then the routine shown in FIG. 5 is returned.

According to the hydraulic control unit shown in FIGS. 1 and 4 is configured to apply the operating pressure Pd to the accumulator 13 in case the operating pressure Pd of the fluid discharged from the hydraulic chamber 3c of the driven pulley 3 is higher than the accumulator pressure Pacc. Instead, as shown in FIG. 6, it is also possible to apply the operating pressure Pd of the fluid discharged from the hydraulic chamber 3c of the driven pulley 3 to a site where a relatively lower pressure is required.

Figure 6:
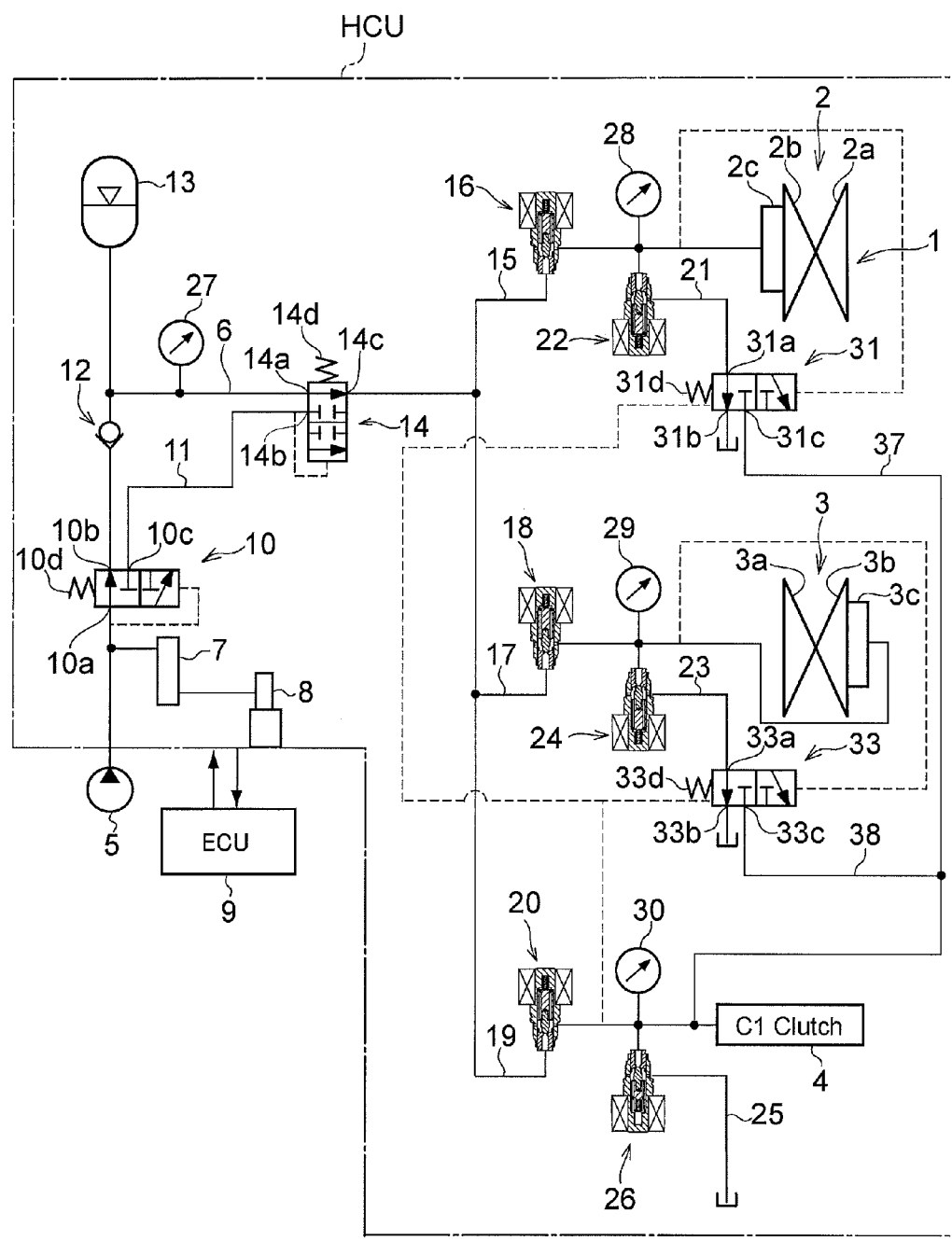
FIG. 6 is a view schematically illustrating a still another example of the hydraulic control unit according to the present invention.

FIG. 6 illustrates still another example of the hydraulic control unit of the present invention. The output port 31c of the switching valve 31 is connected to the passage 37 connected to the feeding passage 19 of the C1 clutch 4. The output port 33c of the switching valve 33 is connected to the passage 38 connected to the passage 37. As shown in FIG. 6, the operating pressure Pc of the C1 clutch 4 is applied as the pilot pressure to the switching valves 31 and 33. In this example, the operating pressure Pc of the C1 clutch 4 is relatively lower than the operating pressures Pri and Pd of the pulleys 2 and 3.

Figure 7:
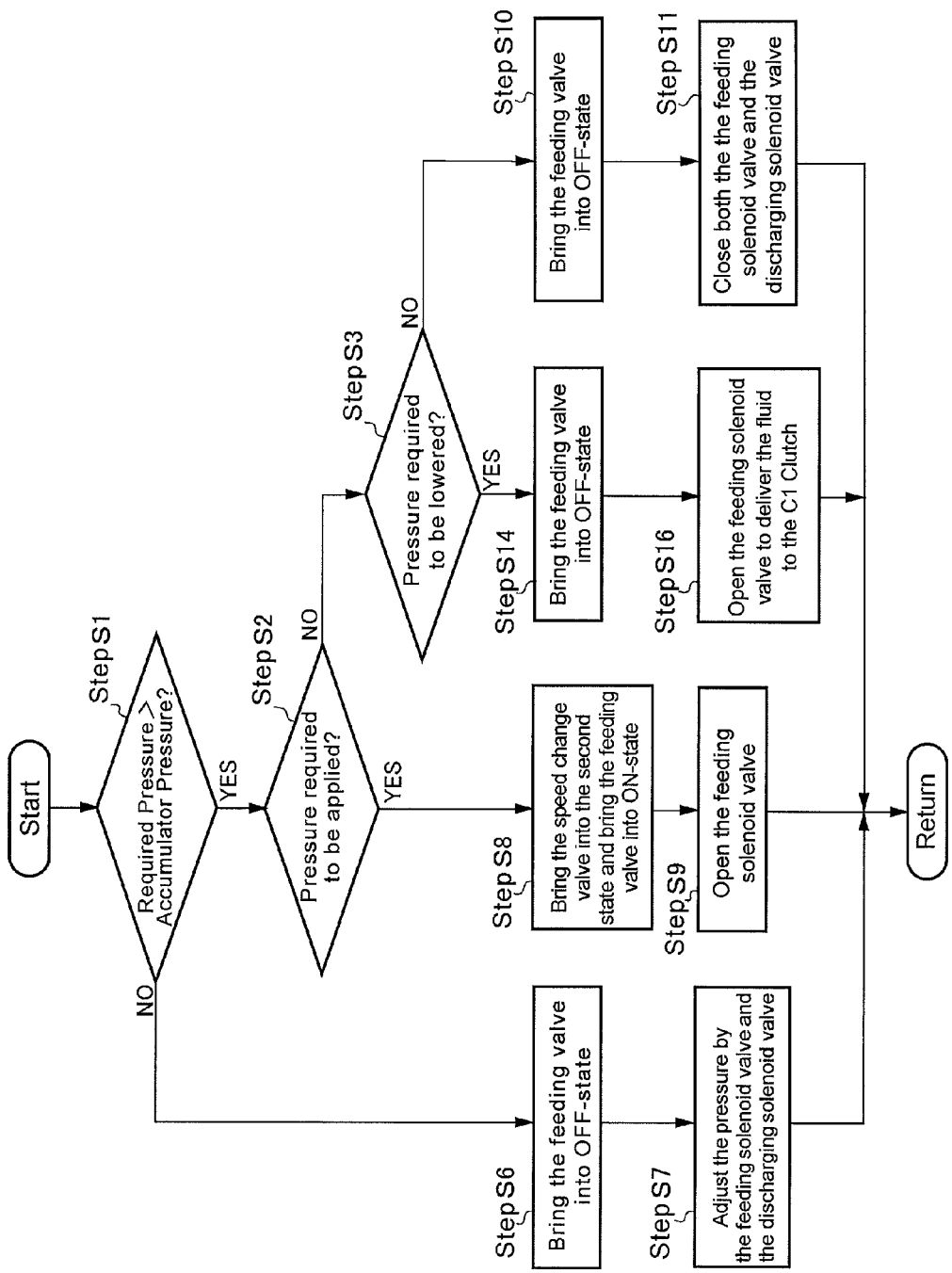
FIG. 7 is a flowchart showing fourth example of the hydraulic control unit according to the present invention.

FIG. 7 is a flowchart explaining a control example of the hydraulic control unit structured as shown in FIG. 6, and the routine shown therein is repeated at predetermined cycle. The control shown in FIG. 7 is carried out under the condition where the operating pressure Pd of the driven pulley 3 is higher than the accumulator pressure Pacc, and the operating pressure Pd has to be discharged. Here, in the flowchart of FIG. 7, common numbers are allotted to the steps identical to those in FIG. 2 and FIG. 5. After or simultaneously with carrying out the control of step S14, the discharging solenoid valve 24 of the driven pulley 3 is opened (at step S16). Although not illustrated in detail, at step S16, the feeding solenoid valve 18 is closed, the feeding solenoid valve 16 of the drive pulley 2 is opened, and the draining solenoid valve 22 is closed. Consequently, the hydraulic chamber 3c is communicated with the C1 clutch 4 so that the relatively higher operating pressure Pd is allowed to be delivered to the C1 clutch 4 where the pressure is relatively lower through the passages 37 and 38. As a result, the operating pressure Pd of the hydraulic chamber 3c is lowered so that the clamping force for belt is reduced. Then the routine shown in FIG. 7 is returned.

Thus, according to the control example shown in FIG. 7, the operating pressure Pd of the hydraulic chamber 2c is applied to the C1 clutch 4 so that efficiency of the hydraulic control unit of the present invention can be improved.

Figure 8:
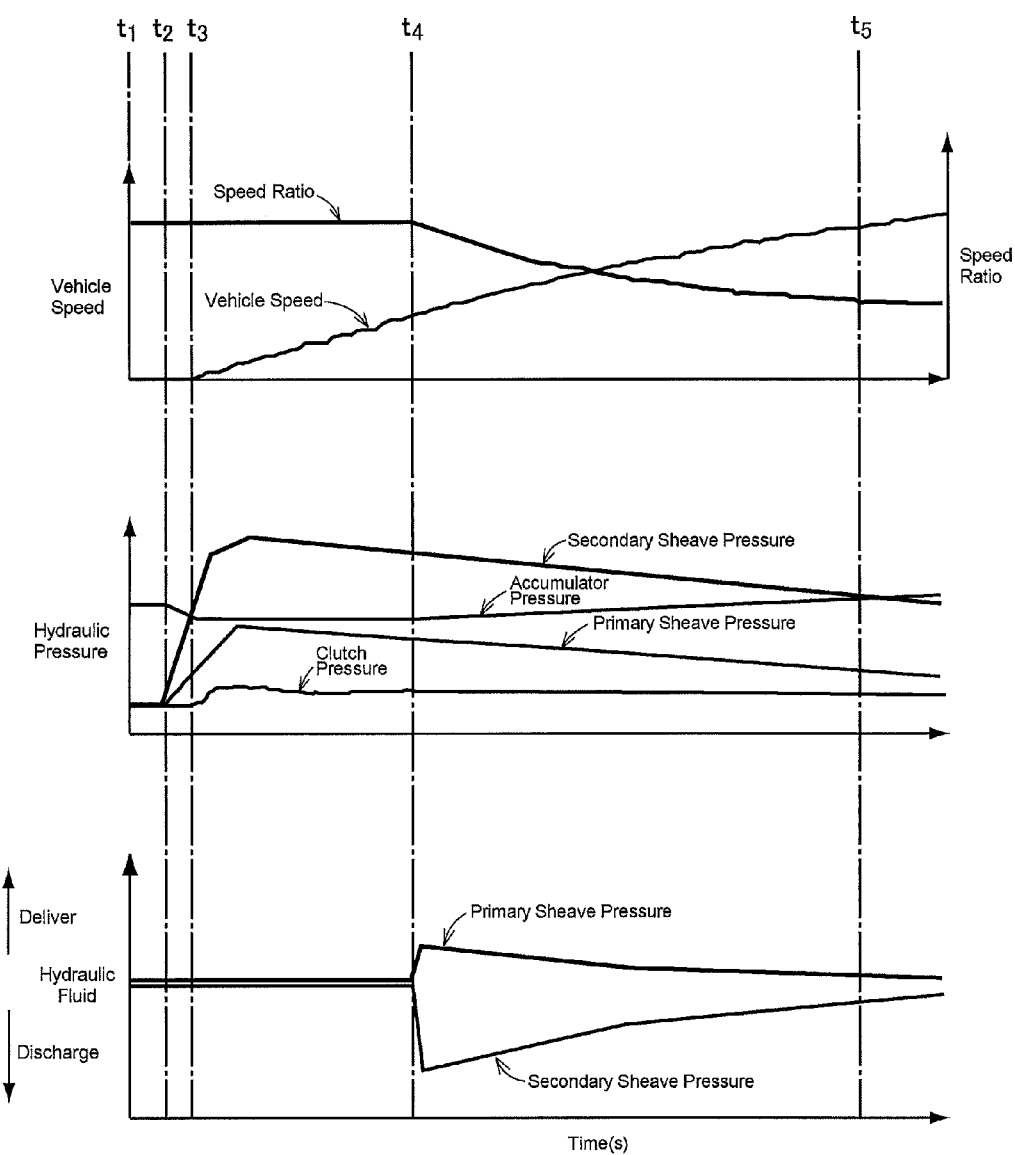
FIG. 8 is a time chart indicating a change in the pressure of each chamber under the situation where the hydraulic control carried out in the hydraulic control unit according to the present invention.

Referring now to FIG. 8, there is shown a time chart indicating a change in the pressure in each chamber under the situation where the hydraulic control unit executes the foregoing controls. In the example shown in FIG. 8, a power switch is pressed manually at point $t_1$ to send a signal for launching the vehicle or starting the engine to the ECU 9. At point $t_1$, a speed ratio of the belt-driven continuously variable transmission 1 is adjusted to a ratio possible to launch the vehicle. Then, at point $t_2$, the fluid is delivered from the accumulator 13 to the hydraulic chambers 2c and 3c and the hydraulic chamber of the C1 clutch 4. Consequently, the accumulator pressure Pacc is lowered and the operating pressures Pri, Pd and Pc are raised.

Meanwhile, a signal pressure established by the signal pressure establishing valve 8 is applied to the regulator valve 7 so that a line pressure is regulated in accordance with a drive demand such as an accelerator opening. At point $t_3$, the switching valve 10 is brought into the second operating state so that the fluid is delivered from the pump 5 to the hydraulic chambers 2c and 3c and hydraulic chamber of the C1 clutch 4. Then, the speed ratio of the belt-driven continuously variable transmission 1 is increased to the maximum ratio. In order to launch the vehicle, large torque capacities of the pulleys 2 and 3 are required. Therefore, each operating pressure Pri and Pd is increased as indicated in FIG. 8 to launch the vehicle. When the vehicle speed starts increasing, the operating pressure Pri and Pd are adjusted according to a drive demand or a vehicle speed to achieve a required torque capacity. Specifically, as indicated in FIG. 8, the operating pressure Pri and Pd is lowered gradually. At point $t_4$, an upshifting is commenced, and the fluid is delivered to the hydraulic chamber 2c and discharged from the hydraulic chamber 3c. In this situation, the operating pressure Pd of the driven pulley 3 is higher than the accumulator pressure Pacc. As described, the operating pressure Pd is applied to the accumulator 13 according to the examples show in FIGS. 2, 3, and 5, and applied to the C1 clutch 4 according to the example shown in FIG. 7. Then, the upshifting is terminated at point $t_5$, and the foregoing routines are returned.

Thus, according to the control examples shown in FIGS. 2, 3, 5 and 7, the operating pressure Pd of the driven pulley 3 is applied to the accumulator 13 when carrying out the upshifting. Alternatively, those control examples may also be carried out on the occasion of downshifting to apply the operating pressure Pc of the C1 clutch 4 to the accumulator 13 instead of the operating pressure Pd.

Here will be explained a relation between the foregoing examples and the present invention. The functional means of steps S1 to S5 and steps S12 to S16 serve as the discharging means of the present invention.

The invention claimed is:

1. A hydraulic control unit, comprising:
a feeding passage that delivers fluid from at least any of an oil pump and an accumulator storing hydraulic pressure to an actuator;
a draining passage that discharge the fluid from the actuator to a drain spot;
a controller that is configured to selectively discharge the fluid from the actuator to the accumulator through the feeding passage, if the fluid has to be discharged from the actuator and a pressure of the accumulator is lower than that of the actuator;
a feeding valve that is disposed on the feeding passage to deliver the fluid from the accumulator to the actuator;
a draining valve that is disposed on the draining passage to discharge the fluid from the actuator to the drain spot; and
a first switching valve that is disposed on the feeding passage to selectively connect to the accumulator to the actuator; and
wherein the controller is further configured to connect the accumulator to the actuator by the first switching valve while opening the feeding valve and closing the draining valve, if the fluid has to be discharged from the actuator and the pressure of the accumulator is lower than that of the actuator.

2. The hydraulic control unit as claimed in claim 1, further comprising:
a second switching valve in which an operating state thereof is selectively switched between
a first operating state where the hydraulic pressure established by the oil pump is delivered to the actuator and the accumulator, and
a second operating state where the hydraulic pressure established by the oil pump is delivered only to the actuator without being delivered to the accumulator.

3. The hydraulic control unit as claimed in claim 2, wherein the oil pump includes a mechanical oil pump driven by an internal combustion engine, and an electric oil pump driven by an electric motor.

4. The hydraulic control unit as claimed in claim 1, wherein the actuator includes a hydraulic chamber to which the hydraulic pressure is applied to narrow a groove width of a pulley of a belt-driven continuously variable transmission.

5. A hydraulic control unit, comprising:
a feeding passage that delivers fluid from at least any of an oil pump and an accumulator storing hydraulic pressure to an actuator;
a draining passage that discharge the fluid from the actuator to a drain spot;
a controller that is configured to selectively discharge the fluid from the actuator to the accumulator through the feeding passage, if the fluid has to be discharged from the actuator and a pressure of the accumulator is lower than that of the actuator;
a passage connecting a discharging valve to the accumulator; and
a switching valve that is disposed on said passage to selectively connect the actuator to at least any one of the accumulator and the drain spot; and
wherein the controller is further configured to connect the accumulator to the actuator by the switching valve while opening a draining valve and closing a feeding valve, if the fluid has to be discharged from the actuator and the pressure of the accumulator is lower than that of the actuator.

6. The hydraulic control unit as claimed in claim 1, wherein the controller is further configured to open the draining valve, at least in any of cases:
that a pressure difference between the actuator and the accumulator is smaller than a predetermined threshold value; and
that a drop in the pressure of the actuator after discharging the fluid therefrom is smaller than a predetermined value.

7. The hydraulic control unit as claimed in claim 5, further comprising:
a second switching valve in which an operating state thereof is selectively switched between
a first operating state where the hydraulic pressure established by the oil pump is delivered to the actuator and the accumulator, and
a second operating state where the hydraulic pressure established by the oil pump is delivered only to the actuator without being delivered to the accumulator.

8. The hydraulic control unit as claimed in claim 7, wherein the oil pump includes a mechanical oil pump driven by an internal combustion engine, and an electric oil pump driven by an electric motor.

9. The hydraulic control unit as claimed in claim 5,
wherein the actuator includes a hydraulic chamber to which the hydraulic pressure is applied to narrow a groove width of a pulley of a belt-driven continuously variable transmission.

10. A hydraulic control unit, comprising:
a feeding passage that delivers fluid from at least any of an oil pump and an accumulator storing hydraulic pressure to an actuator;
a draining passage that discharge the fluid from the actuator to a drain spot;
a controller that is configured to selectively discharge the fluid from the actuator to the accumulator through the feeding passage, if the fluid has to be discharged from the actuator and a pressure of the accumulator is lower than that of the actuator;
a feeding valve that is disposed on the feeding passage to deliver the fluid from the accumulator to the actuator;
a draining valve that is disposed on the draining passage to discharge the fluid from the actuator to the drain spot; and
a first switching valve that is disposed on the feeding passage to selectively connect to the accumulator to the actuator; and
wherein the controller is further configured to connect the accumulator to the actuator by the first switching valve while opening the feeding valve and closing the draining valve, if the fluid has to be discharged from the actuator and the pressure of the accumulator is lower than that of the actuator; and
wherein the controller is further configured to deliver the pressure of the actuator to a site where a relatively low pressure is required, if the fluid has to be discharged from the actuator and the pressure of the accumulator is lower than that of the actuator,
wherein an another passage connects the draining valve to the site where the relatively low pressure is required, and
wherein an another switching valve is disposed on the another passage to selectively connect the actuator to at least one of the drain spot and the site where the relatively low pressure is required.

11. The hydraulic control unit as claimed in claim 10, further comprising:
a second switching valve in which an operating state thereof is selectively switched between
a first operating state where the hydraulic pressure established by the oil pump is delivered to the actuator and the accumulator, and
a second operating state where the hydraulic pressure established by the oil pump is delivered only to the actuator without being delivered to the accumulator.

12. The hydraulic control unit as claimed in claim 11,
wherein the oil pump includes a mechanical oil pump driven by an internal combustion engine, and an electric oil pump driven by an electric motor.

13. The hydraulic control unit as claimed in claim 10,
wherein the actuator includes a hydraulic chamber to which the hydraulic pressure is applied to narrow a groove width of a pulley of a belt-driven continuously variable transmission.

\* \* \* \* \*